(12) United States Patent
Fijnvandraat (10) Patent No.: US 7,751,342 B2
(45) Date of Patent: Jul. 6, 2010

(54) METHOD FOR DETERMINING A NETWORK TOPOLOGY IN AN APPARATUS FOR PROCESSING PHYSICAL DOCUMENTS, SUCH AS POSTAL ITEMS

(75) Inventor: Hendrik Cornelis Fijnvandraat, Enschede (NL)

(73) Assignee: NEOPOST Technologies, Bagneux (FR)

( * ) Notice: Subject to any disclaimer, the term of this patent is extended or adjusted under 35 U.S.C. 154(b) by 1074 days.

(21) Appl. No.: 11/295,684

(22) Filed: Dec. 6, 2005

(65) Prior Publication Data

US 2006/0143306 A1 Jun. 29, 2006

(30) Foreign Application Priority Data

Dec. 6, 2004 (NL) .................................... 1027672

(51) Int. Cl.
*H04L 12/28* (2006.01)
(52) U.S. Cl. ..................................................... 370/254
(58) Field of Classification Search ................. 370/270, 370/312, 390, 432
See application file for complete search history.

(56) References Cited

U.S. PATENT DOCUMENTS

| 4,170,791 | A | 10/1979 | Daughton et al. | ........... 364/900 |
| 7,376,092 | B2 * | 5/2008 | Yajnik et al. | ................. 370/270 |
| 7,403,492 | B2 * | 7/2008 | Zeng et al. | .................. 370/254 |
| 7,415,024 | B2 * | 8/2008 | Johnson et al. | .......... 370/395.1 |
| 2002/0085506 | A1 * | 7/2002 | Hundscheidt et al. | ....... 370/254 |

FOREIGN PATENT DOCUMENTS

| EP | 0 160 167 A1 | 11/1985 |
| EP | 0 376 739 A2 | 7/1990 |
| EP | 0 376 739 B2 | 7/1990 |
| EP | 0 778 523 A2 | 6/1997 |

\* cited by examiner

*Primary Examiner*—Ayaz R Sheikh
*Assistant Examiner*—Blanche Wong
(74) *Attorney, Agent, or Firm*—Sughrue Mion, PLLC (57) ABSTRACT

A method for determining a topology of an apparatus for processing physical documents. The apparatus comprises processing modules and a central control unit. The central control unit and the processing modules are connected by central communication connections. A module communication connection connects the processing modules in series. The module communication connection has a data flow direction with a predetermined orientation with respect to the processing direction.

A processing module upstream in the data flow direction sends first network configuration data. The first network configuration data represents the topology of an upstream part of the data communication network located upstream of the downstream processing module and contains the upstream processing module. A downstream processing module generates second network configuration data on the basis of the first configuration data, which represents the topology of the part of the data communication network that contains the downstream processing module and the part located upstream of the downstream processing module. The downstream processing module sends the second network configuration data to the central control unit. The central control unit determines the topology on the basis thereof.

16 Claims, 7 Drawing Sheets

METHOD FOR DETERMINING A NETWORK TOPOLOGY IN AN APPARATUS FOR PROCESSING PHYSICAL DOCUMENTS, SUCH AS POSTAL ITEMS

CROSS-REFERENCE TO RELATED APPLICATIONS

This application claims priority from Dutch Patent Application No. NL 1027672, filed on Dec. 6, 2004.

FIELD AND BACKGROUND OF THE INVENTION

The invention relates to a method for determining a network topology in an apparatus for processing physical documents, such as postal items.

Apparatuses for processing physical documents, such as postal items, with a number of processing modules are known. In such apparatuses, materials to be processed are treated in a series of consecutive processing steps by the respective processing modules. The processing modules each perform one or more operations with a physical document and after processing pass this document on to a next processing module, which proceeds to perform one or more next processing steps with the document passed on. For instance, a processing module can add an enclosure to a letter and pass it on to another processing module which inserts the letter with enclosure into an envelope.

To regulate the supply, processing and discharge of materials by the processing modules in such an apparatus, the successive processing modules are to be geared to each other to ensure that a document is processed in a correct manner (for instance that enclosures are added to a letter in the correct order and are inserted in an envelope correctly).

European patent specifications EP 376738, EP 376739, EP 376742, EP 376743, EP 377 330 and EP 377 331 disclose a material processing system with a number of material processing peripheral stations. The peripheral stations each have a peripheral computer and means to transport articles serially in a given order through the peripheral stations. The system further comprises a central station having a central computer therein. The peripheral computers and the central computer are connected with each other through a data network with a ring topology. At start-up, the system configures itself automatically. To that end, the central computer, which operates as master control unit, initiates a system configuration analysis command which is sent to a peripheral computer immediately adjacent to the central computer, with a token, i.e. a labeled command. This peripheral computer identifies itself by labeling the system configuration analysis command with an address belonging to the peripheral computer. The peripheral computer sends the thus labeled command on to a next peripheral computer. The next peripheral computer adds its address to the labeled command and in turn sends it further on to a successive peripheral computer in the ring configuration, until the command provided with the address labels of the peripheral computers returns at the central computer. The command returned to the central computer, which has been labeled with the address labels of the peripheral computers, is then stored in a memory, so that the addresses of the peripheral computers are present in the central computer.

A disadvantage of the method and system known from the above-mentioned patent specifications is their being suitable only for a limited number of network types.

Firstly, the method requires a network type in which each element already has a network address prior to the configuration, such as for instance a network operating according to the Internet Protocol. Consequently, peripheral stations that are not provided with a preprogrammed address cannot be used.

Further, the known method and system are suitable only for an apparatus in which the modules and the central control unit are interconnected in a ring-shaped network. The fact is that the central control unit sends the token to the first module, and the last module sends it back to the central control unit. Thus, both the first and the last module need to be connected directly to the central control unit, and the network needs to have a ring shape.

Another disadvantage of the method and system known from the above-mentioned patent specifications is that a configuration error can occur if some peripheral stations have the same preprogrammed address, since in that case the central computer cannot discriminate between peripheral stations with the same address.

SUMMARY OF THE INVENTION

It is an object of the invention to provide a method for determining a topology which can be used in more types of networks. To that end, the invention provides a method.

Such a method can be used in more types of networks, because the processing stations do not need to be provided with a network address, since the central control unit is provided with the second network configuration data. Thus, the central control unit can determine the topology of the data communication network and the relative position of the processing modules, so that the central control unit can drive the processing modules.

A further advantage that can be obtained is that configuration errors can be prevented, since the central control unit can determine the topology of the network. Interchanged connections thus cannot lead to errors, since the positions of the processing units present are known at the central control unit.

Also, such a method can be used in apparatuses for processing physical documents with data communication networks of different topologies, such as bus or branched topologies.

The invention provides further methods. The invention further provides an apparatus, a module control unit and a central control unit. In addition, the invention provides a computer program.

Specific examples of embodiments of the invention are laid down in the claims.

BRIEF DESCRIPTION OF THE DRAWINGS

Further details, effects and examples of the invention are discussed below on the basis of the figures represented in the drawing.

DETAILED DESCRIPTION

Figure 1:
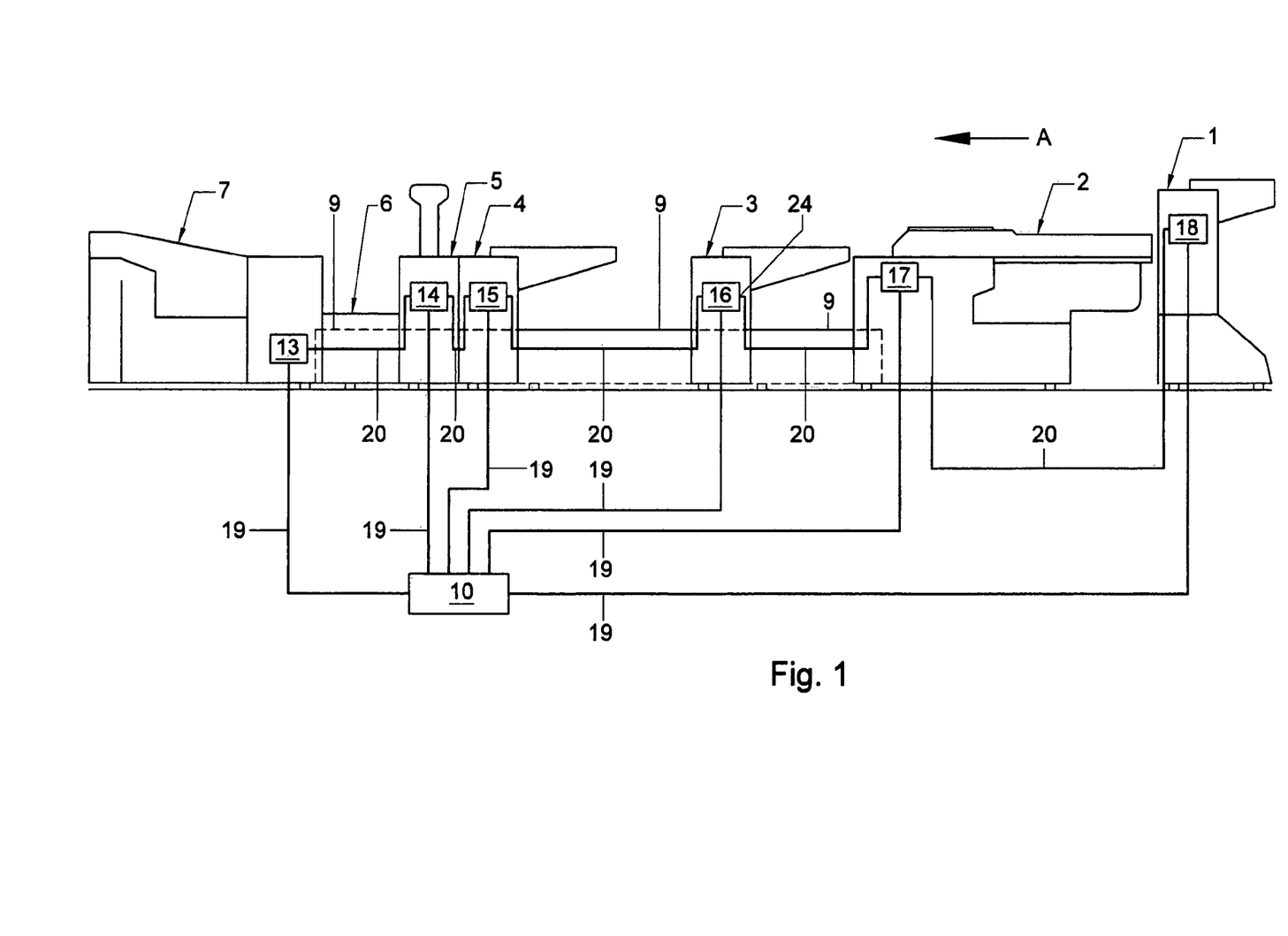
FIG. 1 shows a schematic side elevation of an example of an embodiment of an apparatus according to the invention.

In FIG. 1, an apparatus for processing physical documents, in this example postal items, is shown. The apparatus comprises a number of successive stations or processing modules 1-7. The stations or processing modules 1-7 are, in succession, a feed station 1 for feeding loose sheets, a collating station 2, a first and a second insert feed station 3 and 4, respectively, a folding station 5, a transport unit 6 and an inserter station 7. For the mechanical components of the apparatus shown, stations can be used which substantially correspond in construction to stations of a product line commercialized by applicant under the designation "SI-92".

It is to be noted that many other configurations of processing modules can be used and the invention is not limited to the example shown. In particular, depending on the desired end product, processing modules can be removed or added. Also, the position of one or more processing modules in the processing flow of the physical document may be changed. For instance, the insert feed stations 3 and 4 may be replaced with a different type. Also, the feed station 1 and the collating station 2 could be replaced with a single processing module, or otherwise changes could be made in the configuration.

The feed station 1 is suitable for feeding loose sheets to the collating station 2. In the collating station 2, the sheets received from the feed station 1 can optionally be collated in stacks, for instance each forming a set of documents to be processed into a postal item. The sheets or stacks of sheets can then be passed along the insert feed stations 3 and 4, where, if desired, inserts are added. In the folding station 5, the sheets and inserts are folded. If sheets and inserts have been collated in a stack upstream of the folding station 5, they are folded simultaneously, as a stack. The transport unit 6 comprises a transport track 9, to which are coupled the inserter station 7, the folding station 5, the insert feed stations 3, 4 and the collating station 2. The folding station 5 and the insert feed stations 3, 4 have a greater width than the transport track 9 and have been placed from above over the transport track 9.

The example of an apparatus shown in FIG. 1 furthermore comprises a central control unit 10 and a number of module control units 13-18, each belonging to one of the stations or processing modules 1-7. The module control units 13-18 are each connected with the central control unit 10 through a data communication connection 19. Via the data communication connections 19, the central control unit 10 can send an instruction to the module control units 13-18. On the basis of the instruction given, the respective module control unit 13-18 controls the equipment present in the respective station 1-7. For instance, a module control unit 13-18 can switch on or switch off a check for double sheets, set the number of sheets to be dispensed per instruction or perform another operation.

The module control units 13-18 are further interconnected via a module communication connection 20. Via the module communication connection 20, adjacent module control units can exchange information. For instance, the module control unit 18 in the feed station 1 can pass on to the module control unit 17 of the collating station 2 that the feed station 1 has executed an instruction and no further feed will follow, or other information can be exchanged between the module control units 13-18.

Figure 2:
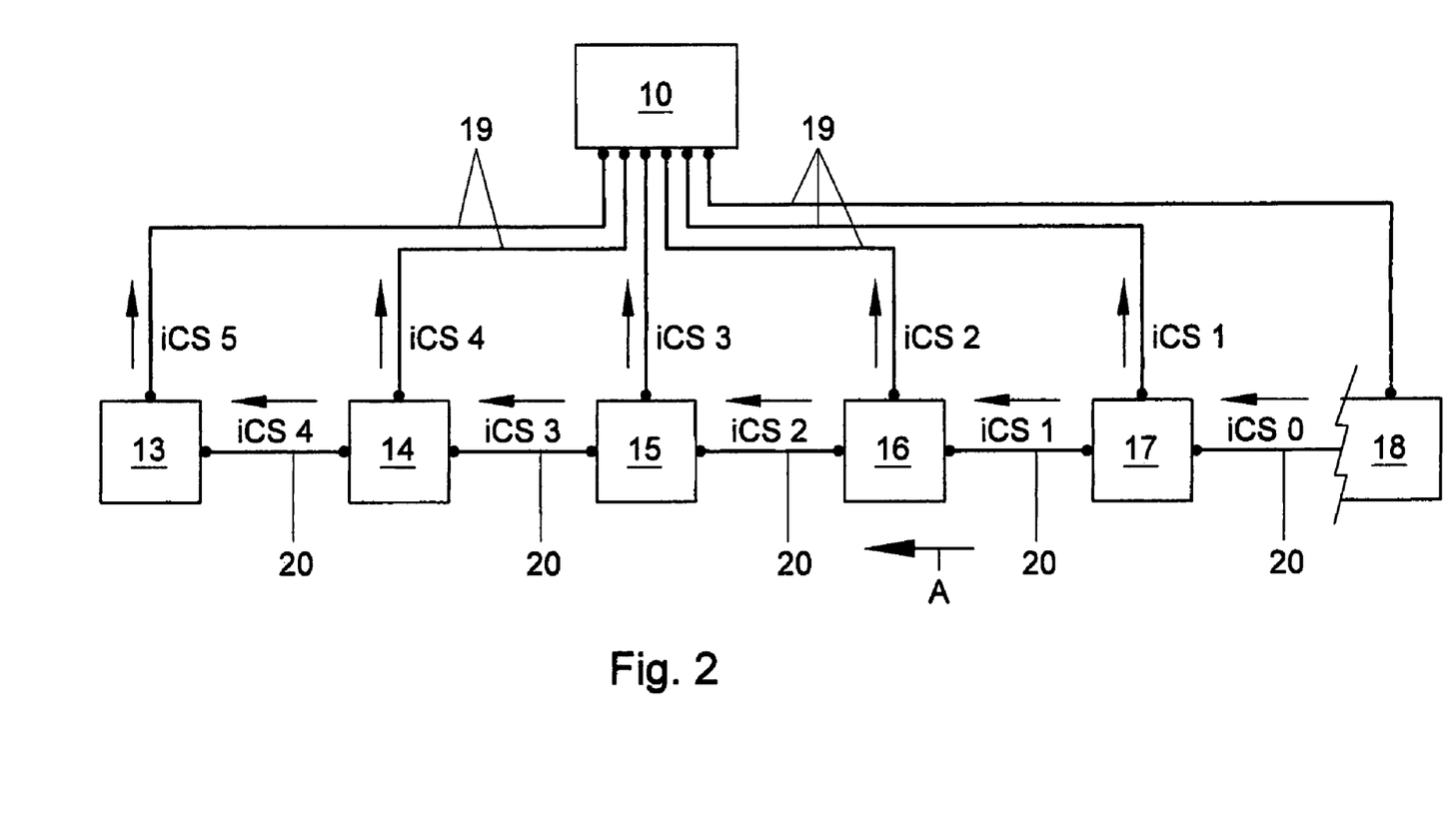
FIG. 2 schematically shows the topology of the data network that connects the control units in the apparatus according to FIG. 1.

The central control unit 10, module control units 13-18 and communication connections 19, 20 jointly form a data communication network in which the control units 10, 13-18 form nodes. The module control units 13-18 are connected in series via the module communication connection 20. Via the series connection of the module control units 13-18 formed by the module communication connection 20, a data flow between the module control units 13-18 can be effected. The data flow has a predetermined direction with respect to the processing direction A of the physical documents. In the example shown, the data flow direction corresponds to the processing direction A. The data flow direction can also be opposite to it or have a different suitable predetermined orientation with respect to the processing direction A. In the example of FIGS. 1 and 2, the adjacent nodes in the data communication network thus correspond to processing modules that are adjacent to each other in the processing direction A of the documents.

In the example of FIGS. 1 and 2, for instance the module control unit 18 of the feed station 1 and the module control unit 17 of the collating station 2 form adjacent nodes in the data communication network. The module control unit 17 is here situated downstream with respect to the module control unit 18 in the processing direction A of the physical documents, analogously to the position of the collating station 2 with respect to the feed station 1.

In the setup of stations 1-7 shown in FIG. 1, the module control unit 17 of the collating station 2 is further connected with the module control unit 16 of the first insert feed station 3. The module control unit 16 has as adjacent, downstream node the module control unit 15 of the second insert feed station 4. The module control unit 14 of the folding station 5 forms the downstream adjacent node of the module control unit 15 of the second insert feed station 4. The module control unit 14 of the folding station is connected directly with the module control unit 13 of the inserter station 7.

For driving an apparatus comprising a plurality of stations or processing modules, in addition to information regarding the stations or processing modules present, also the position of those stations or processing modules should be known at the central control unit 10. This is because the positions of the stations determine the order in which a physical document to be processed passes the stations, and hence the order of processing operations (for instance, adding a single-sheet insert prior to folding or, conversely, adding an insert in the form of a booklet after folding).

In the example shown in FIG. 1 the module control units 13-18 of the processing stations 1-7 are arranged to generate network configuration data and to send this via the module communication connection 20 in the processing direction A of the physical documents. The module control units 13-18 can also send network configuration data to the central control unit 10 via the respective data communication connection 19.

The network configuration data of the module control units 13-18 is generated as follows. At the start of the topology determination that is carried out by the example shown in FIG. 1, each of the module control units 13-18 sends a configuration request to the module control unit of the processing module 1-7 situated immediately upstream of the respective module control unit in the processing direction A of the documents. The module control unit 13 of the inserter station 7 thus asks the module control unit 14 of the folding station 5 for the network configuration data, the module control unit 14 asks module control unit 15 of second insert feed station 4, etc.

In the example of FIGS. 1 and 2, each module control unit 13-18 transmits a configuration request periodically. Thus, the central control unit 10 is quickly informed of modifications in the configuration of the apparatus. By virtue of this automatic, periodic configuration determination, the apparatus does not need to be shut down entirely to make a modification.

If a module control unit 13-18 does not receive a request from a module control unit of a processing module located further downstream, the module control unit establishes that it constitutes the module control unit of the most downstream processing unit. In the example of FIGS. 1 and 2, the module control unit 13 of the inserter station 7 will not receive a request and hence establish that it is the most downstream processing module.

If a module control unit 13-18 does receive a configuration request, then, in response to the received configuration request, the receiving module control unit also sends a configuration request upstream.

Also, the receiving module control unit can send an acknowledgement of receipt downstream to the sending module control unit. The sending module control unit then knows that upstream of it, at least one module control unit is present. If at a particular time after sending the configuration request, the sending module control unit still has not received an acknowledgement, then the sending module control unit establishes in that case that it belongs to the most upstream processing module. In this example, the module control unit 18 of the feed station 1 is the most upstream unit.

In response to the configuration request, the interrogated module control unit determines the topology of an upstream part of the data communication network. This upstream part is situated upstream of the downstream processing module and contains the interrogated module control unit.

For instance, the interrogated module control unit can determine that topology on the basis of network configuration data which the interrogated module control unit has received from the module control unit which constitutes its upstream neighbor. For the interrogated module control unit knows that the interrogated module control unit constitutes the most upstream unit if no data are received from an upstream neighbor.

If the interrogated module control unit does receive network configuration data, the interrogated module control unit can simply determine the topology of the upstream part, since the network configuration is received from a module control unit that belongs to the upstream, immediately adjacent processing module. The interrogated module control unit can thus derive the topology of the upstream part from the received network configuration data and its position with respect to the module control unit whose network configuration data has been received, i.e. its upstream adjacent neighbor.

After the topology determination, the interrogated module control unit sends first network configuration data to the requesting downstream module control unit. The first network configuration data represents the topology of the upstream part.

In the example of FIGS. 1 and 2, the module control unit 18 of the feed station 1 establishes that it is the most upstream module control unit. After this, module control unit 18 sends network configuration data iCS 0 to the module control unit 17 of the collating station 2. On the basis thereof, the module control unit 17 determines network configuration data iCS 1 and sends it to the module control unit 16 of the first insert feed station 3. In response, module control unit 16 sends network configuration data iCS 2 to the module control unit 15 of the second insert feed station 4. Module control unit 15 sends network configuration data iCS 3 to the module control unit 14 of the folding station 5, which in turn sends network configuration data iCS 4 to the module control unit 13 of the inserter station 7.

After receipt of the first network configuration data, the requesting downstream processing module generates second network configuration data on the basis of the first configuration data and the position of the downstream processing module with respect to the upstream processing module, viz. immediately adjacent. At the module control unit of the downstream processing module it is therefore known that to the topology represented by the first network configuration data, the position of the downstream processing module can be added. This position is the node in the data network directly adjacent to the module from which the first network configuration data originates. On the basis of this information, the module control unit of the downstream processing module can compile the second network configuration data. The second network configuration data thus represents the topology of the part of the data communication network that contains the upstream processing module and the part situated upstream thereof.

Next, the downstream processing module sends the second network configuration data further downstream and/or to the central control unit 10. The central control unit 10 then determines on the basis of the received network configuration data the topology of the data communication network and the relative arrangement of the processing modules.

In the example of FIGS. 1 and 2, the network configuration data sent by the respective module control units contains information concerning types of processing modules present and the relative position of the types present. For instance, to that end, the first network configuration data can be sent as a string with identification numbers for types of processing modules, with the order of the numbers representing the position of the processing modules in the processing direction. A module control unit receiving the string can then add to the string an identification of the type of the processing module to which the receiving module control unit belongs. After this, the adapted string can be sent further downstream by the receiving module control unit. For instance, the number at the beginning of the string can represent the most downstream module, in which case the receiving module control unit can add the identification at the beginning of the string.

Also, the number at the end of the string could represent the most downstream module. In that case, the identification can be added at the end of the string. This has as an advantage that in data communication networks the data is often sent in the form of a data package. The beginning of the data package, the header, contains information about e.g. the destination and the sender, the network protocol by which the package has been transmitted, the length of the package, etc. Behind the header, then, are the actual data, also referred to as 'payload'. When adding data to the end of the string, it is not necessary to determine the correct position for addition of the data (to prevent the information being placed in the header). The information can be added at the end of the package and is then automatically in the correct position.

When using a string with type-identification, the central control unit 10 can contain a memory in which are stored identification numbers for different types of processing modules and optionally further data on the type of processing module belonging to a number. From the order of the identification numbers in the string, the central control unit 10 can then determine the topology of at least a part of the data communication network. In that case, the network configuration data itself does not need to contain extensive information about the processing modules and the amount of data sent over the network is reduced.

In the example of FIGS. 1 and 2, for instance the respective network configuration data iCS 0-iCS 5 can be built up as the following strings:

iCS 0=1, 00
iCS 1=2, 10, 00
iCS 2=3, 20, 10, 00
iCS 3=4, 20, 20, 10, 00
iCS 4=5, 30, 20, 20, 10, 00
iCS 5=6, 40, 30, 20, 20, 10, 00

The first number in the string indicates how many processing modules are present in the part of the data communication network to which the network configuration data relates. The next numbers are the identification numbers of the types of processing modules. In this example, for instance the value 00 represents a feed station, the value 10 a collating station, the value 20 an insert feed station, the value 30 a folding station 5, and the value 40 an inserter station 7. From the order of the values, the order of the processing modules 1-7 can then be derived.

For instance, the topology of the whole data communication network can already be derived from the network configuration data iCS 5 which is sent out by the module control unit 13 of the most downstream processing module, the inserter station 7. In this example, it can be derived from it that a series of six processing modules are present, which, in the processing direction A, are of the types 00, 10, 20, 30, 40, i.e. the series contains in succession: a feed station 1 for feeding loose sheets, a collating station 2, a first and a second insert feed station 3 and 4, respectively, a folding station 5, a transport unit 6 and an inserter station 7.

It is also possible, however, that the central control unit 10 receives second network configuration data from several, at least two, downstream processing modules. In the examples of FIGS. 1-5, for instance all module control units 13-18 send the second network configuration data to the central control unit 10 via the data connections 19. In that case, the central control unit 10 can determine the position of the downstream processing modules on the basis of differences in the second network configuration. The central control unit 10 can for instance compare the dimensions of the respective second network configuration data. In the above-described example, the central control unit 10 can for instance derive that module control unit 17 is situated upstream of module control unit 16, since the length of the network configuration data iCS 1 is shorter than the length of the network configuration data iCS 2.

If two or more module control units each send network configuration data via a separate data connection 19 to the central control unit 10, the central control unit 10 can determine which module control units 13-18 are present and which of the data connections 19 belongs to which module control unit 13-18, since the network configuration data are different for each module control unit. If the topology of the data communication network is changed, for instance because data connections 19 are adjusted or the arrangement of the processing modules 1-7 is changed, the central control unit 10 can thus determine simply via which data connection 19 which module control unit 13-18 can be reached.

In the example of FIGS. 1 and 2, the central control unit 10 can for instance determine that the network configuration data comes from a processing module of the type that corresponds to the value at the beginning of the string and that the data connection 19 over which that data is received belongs to that type of module. Also, the central control unit 10 can derive the position in the data flow, and hence the processing flow, since the network configuration data also contains the information about the topology of the part upstream of the processing module.

In the example of FIGS. 1 and 2, the data connections 19 between the central control unit 10 and the module control units 13-18 are all point-to-point connections. As a consequence, the module control units 13-18 can all at the same time communicate with the central control unit 10. Thus, the central control unit 10 can receive network configuration data from a plurality of module control units 13-18 or drive a plurality of module control units 13-18 simultaneously.

Also, by virtue of the point-to-point character, the connections between the central control unit 10 and the module control units 13-18 can be of different types. For instance, it is possible that the apparatus simultaneously includes both module control units that communicate via a particular protocol, e.g. the USB protocol, and module control units that communicate via a different protocol e.g. RS-232.

Figure 3:
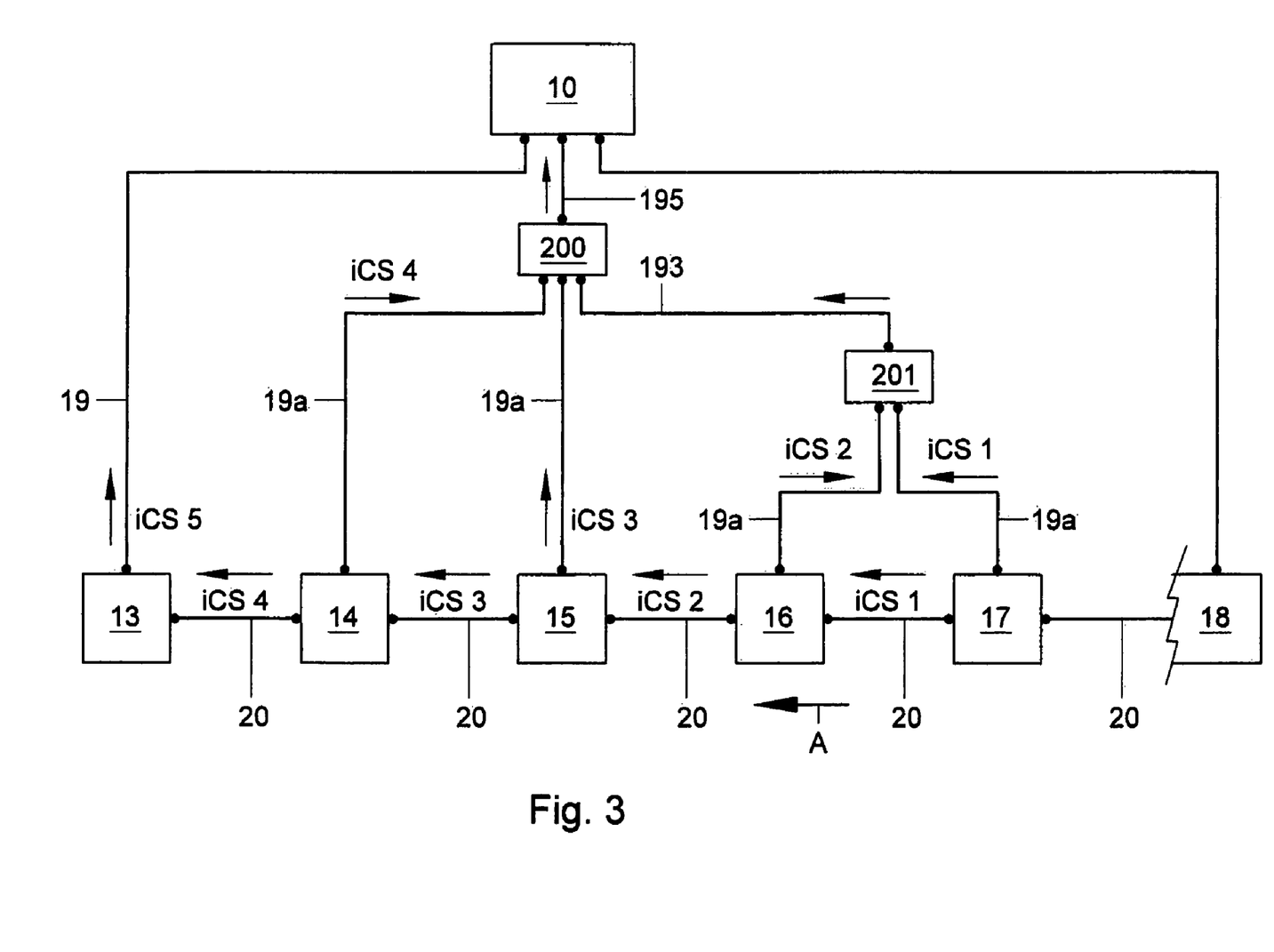
FIGS. 3-7 schematically show further examples of network configurations suitable for use in an apparatus or method according to the invention.

The central control unit 10 may also be connected with the module control units 13-18 in a different manner than shown in FIGS. 1 and 2. In the example of FIG. 3, for instance, between the central control unit 10 and the module control units 13-18 in the processing modules 1-7, a more complex network of data connections 19, 19a, 193, 195 is present.

In the example of FIG. 3, the module control unit 13 of the inserter station 7 is connected through a point-to-point connection 19 with the central control unit 10, and also the module control unit 18 of the feed station 1 is connected directly with the central control unit 10 via a point-to-point connection 19. The module control unit 14 of the folding station 5 is connected via a point-to-point connection 19a with a first network hub 200, and so is the module control unit 15 of the second insert feed station 4. The module control unit 16 of the first insert feed station 3 and the module control unit 17 of the collating station 2 are each connected through a point-to-point connection 19a with a second network hub 201. The second network hub 201 is connected through a data connection 193 with the first network hub 200. The first network hub 200 in turn is connected through a suitable data connection 195 with the central control unit 10.

In the example of FIG. 3, the network hubs 200, 201 can for instance be designed as Universal Serial Bus (USB) hubs. After initiation of the USB hubs and the connections 19a, 193, 195 connected thereto, in a manner known per se, according to the USB standard, the central control unit 10 can receive the network configuration data from the various module control units 13-18. From the received data, the central control unit 10 can derive which module control unit belongs to which connection. From the network configuration data it can be derived from which module control unit it originates, viz. the most downstream one in the network part that is described by that network configuration data. Also, the central control unit 10 can determine in which order the control signals are to be sent over the connections, viz. in accordance with the processing flow of the physical documents by the processing modules 1-7.

If the network configuration data contains the above-described strings, the central control unit 10 in the example of FIG. 3 can simply derive from which module control units 13-18 the network configuration data originates. The fact is that the connection over which the shortest string has come in belongs to the most upstream module control unit 18. The connection over which the longest string has come in belongs to the most downstream module control unit 13. The other connections, through sorting the strings according to length, can also be coupled to one of the module control units 13-18.

The system shown in FIG. 3 is simple to expand, for instance through addition of hubs, without necessitating extra direct connections (such as connections with reference numerals 19 and 195 in FIG. 3) with the central control unit 10.

As the central control unit 10 can determine which data connection belongs to which processing module 1-7, the connections between the central control unit 10 and the processing modules 1-7 can moreover be easily adapted.

Also, similar processing modules, despite their being mutually indistinguishable in type, can still be driven by the central control unit 10. This is because the central control unit 10 can derive from the network configuration data which type of processing module is located at which position in the data flow direction, and hence the processing direction, and which data connection belongs to which position. Thus, the central control unit 10 can still control the processing modules in the desired order.

Figure 5:
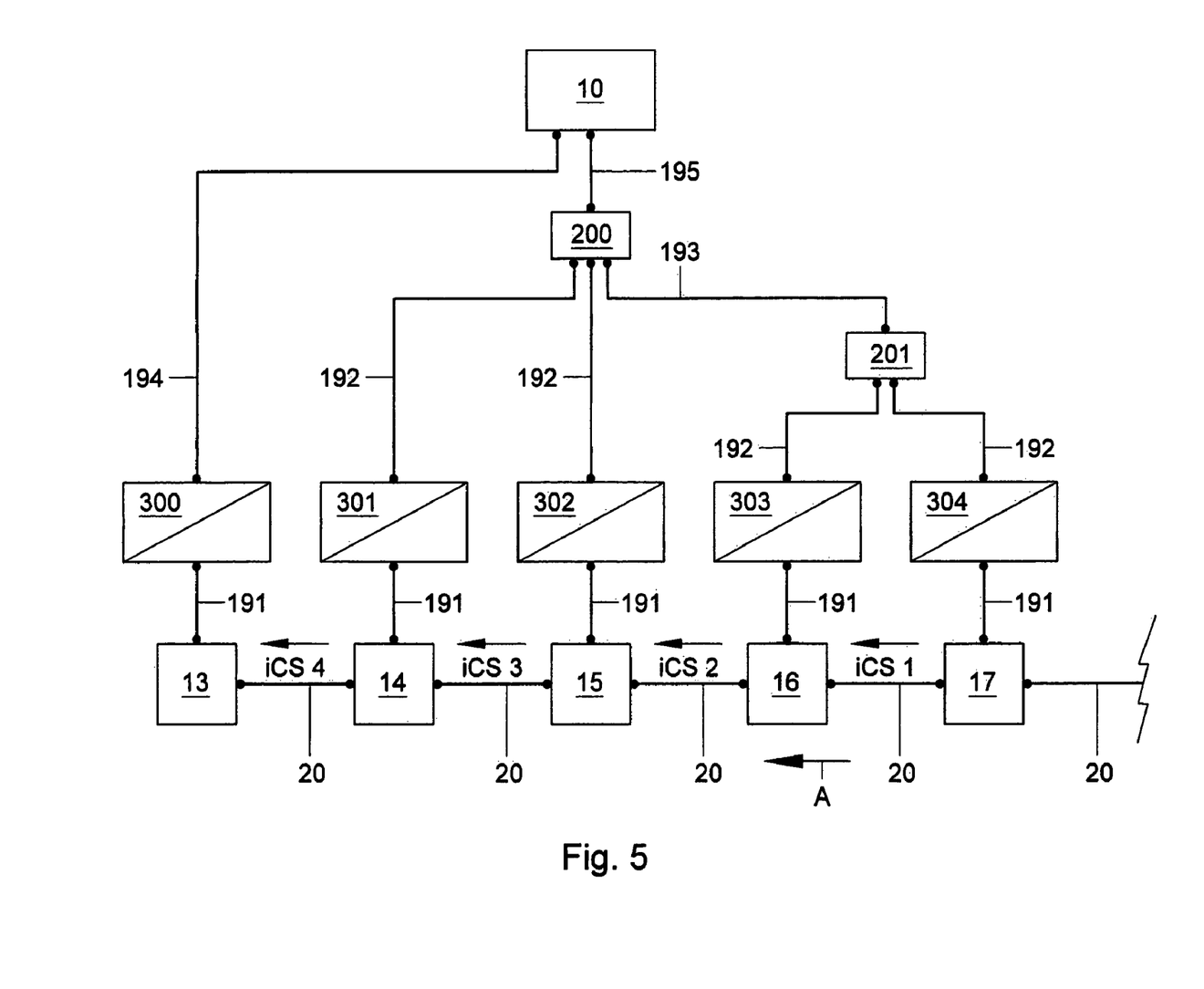

For instance, as shown in FIG. 5, it is possible in the example of FIG. 3 to place network converters 300-304, known per se, between the module control units and the connections. The network converters 300-304 convert data belonging to a particular network type to data belonging to a different network type, thus additionally allowing the use of processing modules that require a different type of network. For instance, the converters 300-304 can convert USB-compliant signals into RS-232 signals and vice versa. In the example of FIG. 5, the module control units 13-18 send signals to the central control unit 10 over respective RS-232 connections 191, also known as serial or COM ports. Via the RS-232 connections 191, each of the module control units 13-18 is connected with an adapter 300-304 which converts the RS-232 connections into USB connections 192-195.

Figure 4:
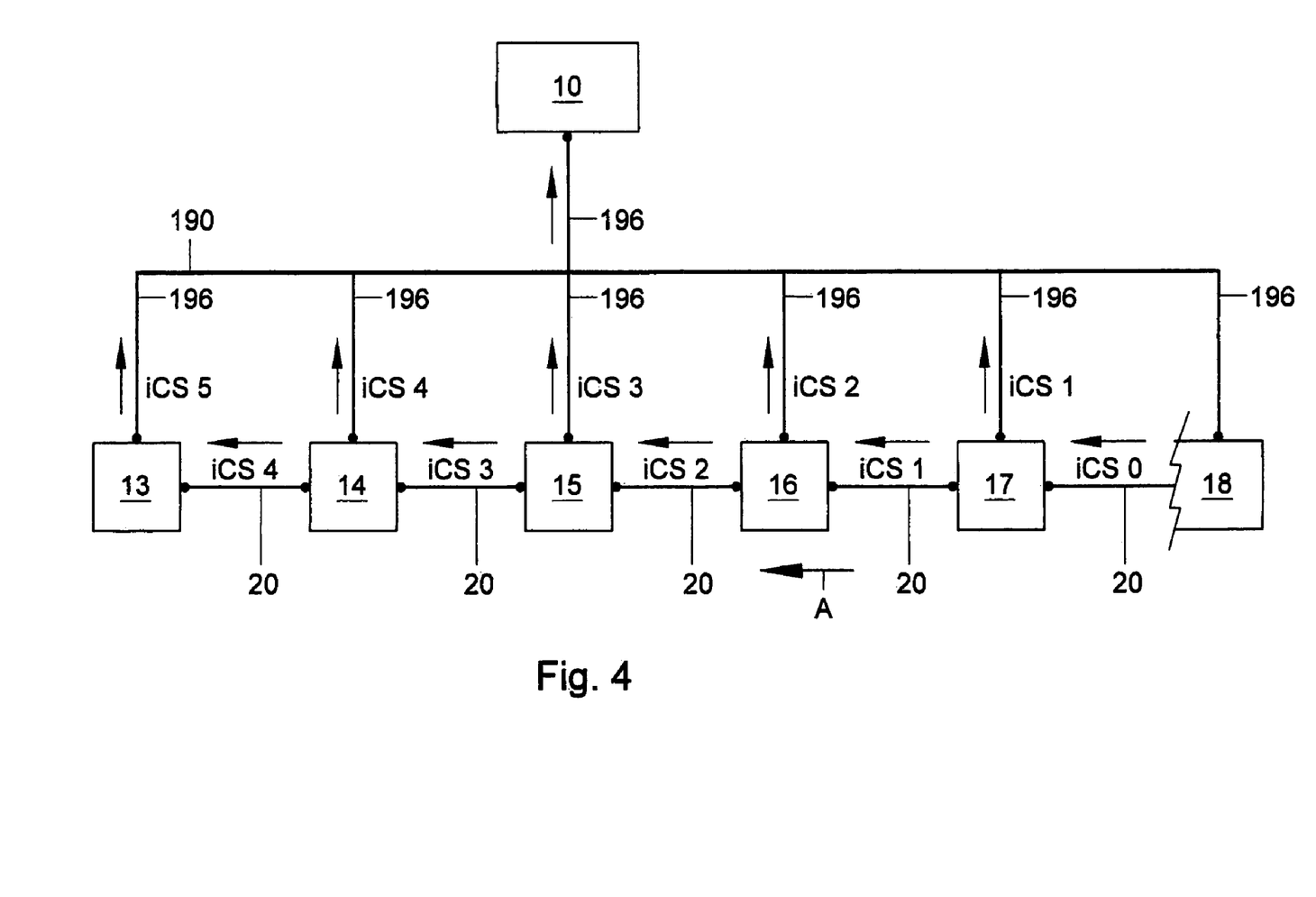

In the example of FIG. 4, the central control unit 10 is connected with the module control units 13-18 of the processing modules 1-7 through a self-configuring bus 190, i.e. a bus without fixed addresses (such as for instance a universal Plug and Play—UPnP, for short—bus). The central control unit 10 and the module control units 13-18 are connected with the self-configuring bus 190 through a connection 196.

Figure 6:
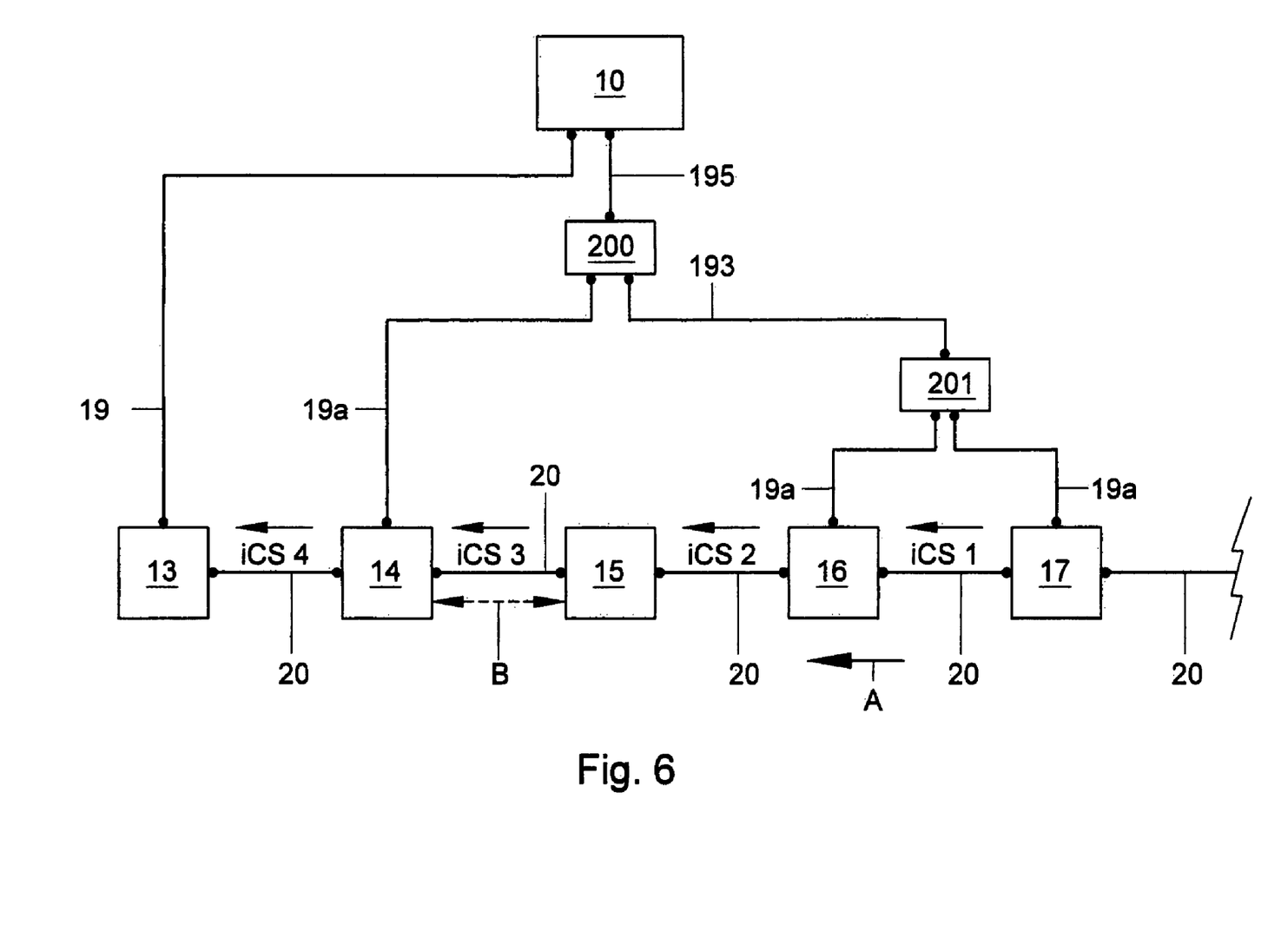

In the example of FIG. 6, the module control unit 15 of the second insert feed station 4 is non-directly connected with the central control unit 10. The central control unit 10 can determine from the network configuration data which processing modules are present in which order and via which data connection the central control unit 10 can communicate with a specific module control unit 13-18. Thus, the central control unit 10 can also determine via which route the non-directly connected module control unit 15 can be reached. Thus, in this example, the non-directly connected module control unit 15 can be reached via the module control unit 14 of the folding station 5, as indicated with arrow B.

For instance, from the received network configuration data the central control unit can determine the topology and derive therefrom that from one or more non-directly connected processing modules no network configuration data has been received. The central control unit can then proceed to determine where non-directly connected modules are situated in the network and how these can be reached. When for instance the strings described hereinabove with reference to FIGS. 1 and 2 are used, then in the example of FIG. 6 the central control unit 10 will receive the following strings:

iCS 0=1, 00
iCS 1=2, 10, 00
iCS 2=3, 20, 10, 00
iCS 4=5, 30, 20, 20, 10, 10, 00
iCS 5=6, 40, 30, 20, 20, 10, 00

The module control unit 15 of the second insert feed station 4 in that case has not reported iCS 3 to the central control unit. From the strings the central control unit did receive, it can derive that between module control units 14 and 16 a module control unit is present. The processing module 14 which reported string iCS 4 to the central control unit 10, can be seen by the central control unit 10. So, the central control unit 10 can derive that via that module the module control unit 15 of the second insert feed station 4 can be reached.

In the examples of FIGS. 1-6, the module communication connection 20 is a linear, unbranched connection, that is, each module control unit 13-18 is only connected with one upstream and one downstream module control unit, which thus form the adjacent upstream and downstream neighbors, respectively. However, the module communication connection 20 can also have a more complex structure and the module control units can have a plurality of module control units as upstream or downstream adjacent neighbor.

Figure 7:
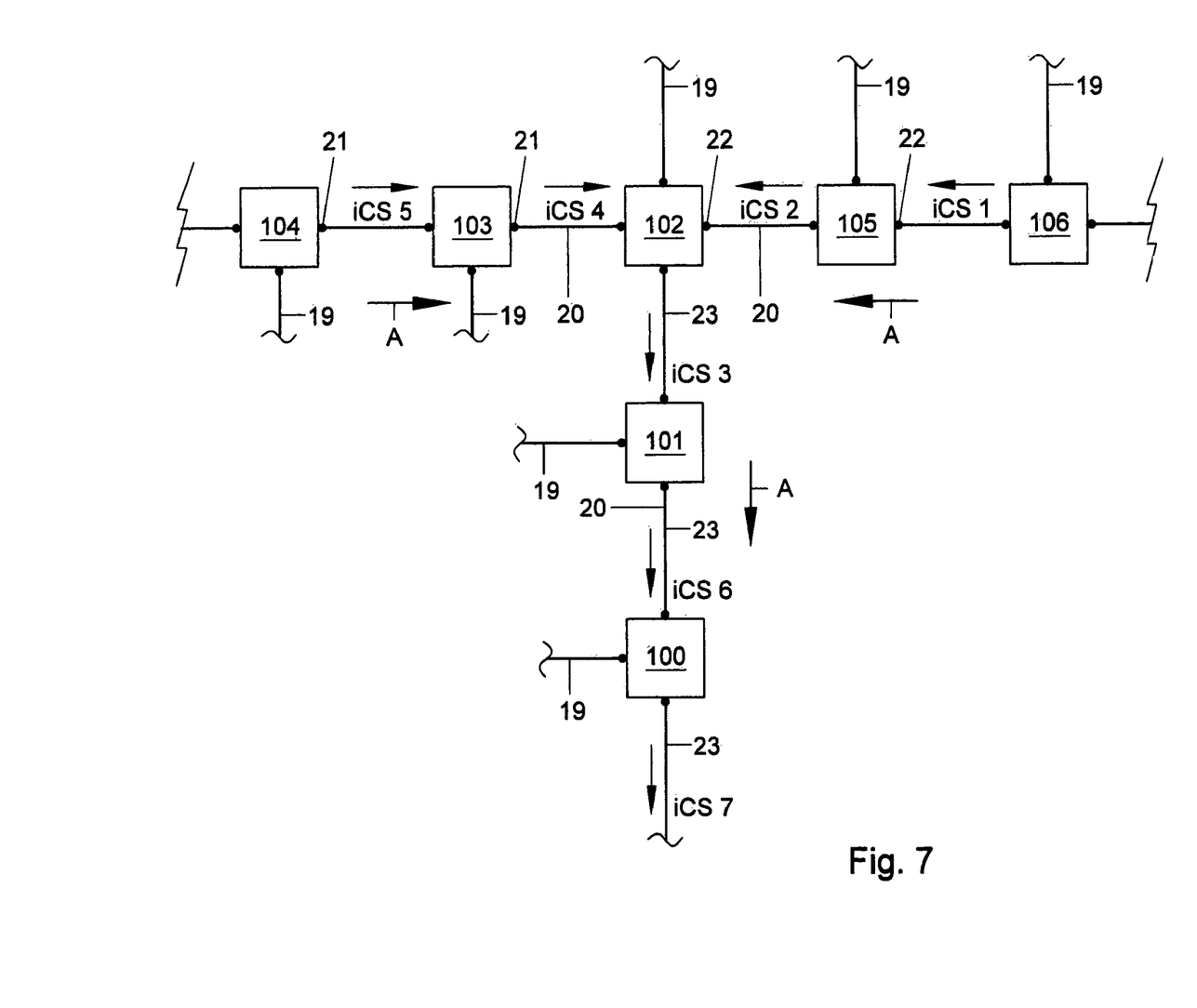

In the example of FIG. 7, the module communication connection 20 has upstream network branches 21, 22. The module control unit 102 has two upstream adjacent neighbors, viz. module control units 103, 105, each forming the downstream end of a network branch 21 or 22. The first network branch 21 contains two module control units 103, 104 and the second network branch 22 contains two module control units 105, 106. Downstream of the module control unit 102, the connection is unbranched, containing a linear connection 23 with two modules 101,100.

In the example of FIG. 7, in use, the module control unit 106 sends network configuration data iCS 1 to the module control unit 105. The module control unit 105 then sends network configuration data iCS 2 to the module control unit 102. The module control unit 104, in use, sends network configuration data iCS 5 to the module control unit 103, while the module control unit 103 then sends network configuration data iCS 4 to the module control unit 102. The module control unit 102 can send network configuration data iCS 3 to the module control unit 101. The module control unit 101 sends network configuration data iCS 6 to the module control unit 100. The module control unit 100 sends network configuration data iCS 7 to the central control unit 10, not shown in FIG. 7.

When the network configuration data contains the above-described strings, the network configuration data sent by module control units 100-106 shown in FIG. 7 can for instance be as follows:

iCS 1=1, 20
iCS 2=2, 10, 20
iCS 3=11, F9, 1, 50, F2, 2, 10, 20, FA, 2, 11, 20
iCS 4=2, 11, 20
iCS 5=1, 20
iCS 6=12, 30, F9, 1, 50, F2, 2, 10, 20, FA, 2, 11, 20
iCS 7=13, 40, 30, F9, 1, 50, F2, 2, 10, 20, FA, 2, 11, 20

Here, the first value in the string indicates the total number of values in the string. A value starting with F indicates an aspect of a branch. In this example, F9 indicates there is a branchpoint, F2 that the codes that follow relate to a right-hand branch and FA denotes that the codes that follow relate to a left-hand branch.

The network configuration data iCS 7 sent to the central control unit thus contains the following information: there are 13 values present in the string. The most downstream processing module is of a type 40 (for instance an inserter station), the adjacent upstream neighbor thereof is of the type 30 (folding station). Upstream of the folding station is a branchpoint (F9). This branchpoint contains one value, viz. the type of the point of branching, viz. type 50. The right-hand branch (F2) contains two values, viz. the most downstream one is a processing module of type 10 (feed station) and upstream thereof is a processing module of type 20 (insert feed station). The left-hand branch (FA) contains two values, viz. the most downstream one is a processing module of type 11 and upstream thereof is a processing module of type 20 (insert feed station).

In the example of FIG. 7, the central control unit 10 can determine via the data connections 19 which data connection 19 belongs to which module control unit 100-106. As has been explained hereinbefore in respect of FIGS. 1 and 2, the central control unit 10 can determine this in that the topology of the data network can be determined from the network configuration data. From the network configuration data it can also be determined from which position in the data communication network it originates. In the case of the above-described strings, the central control unit 10 can determine that the longest string (iCS 7) originates from the most downstream module control unit 100, while the shortest strings (iCS 5, iCS 1) originate from the most upstream module control units 104, 106.

In the example of FIG. 7, module control units 104, 106 are located at symmetrical positions in the respective first and second network branch 21, 22 and the network configuration data iCS 5, iCS 1 is of equal form. To discriminate between the two module control units 104, 106, the central control unit 10 in this example, when determining that no discrimination is possible for two or more modules, sends a marking signal to one of the two module control units 104, 106 via the respective data connection 19. In response to the marking signal, the module control unit that receives the marking signal adds a value FF to its network configuration data. Assuming that the module control unit 104 receives the marking signal, the network configuration data in this example are as follows:

iCS 1=1, 20
iCS 2=2, 10, 20
iCS 3=12, F9, 1, 50, F2, 2, 10, 20, FA, 3, 11, 20, FF
iCS 4=3, 11, 20, FF
iCS 5=2, 20, FF
iCS 6=13, 30, F9, 1, 50, F2, 2, 10, 20, FA, 3, 11, 20, FF
iCS 7=14, 40, 30, F9, 1, 50, F2, 2, 10, 20, FA, 3, 11, 20, FF

The central control unit 10 then waits until the network configuration data iCS 7 are longer by one value and then determines again the combinations of data connections 19 and module control units 100-106 that are present. Since the network configuration data iCS 1, iCS 5 of the most upstream module control units 104, 106 differ now, the central control unit 10 can determine which data connection 19 belongs to which module control unit.

The invention is not limited to the above-described examples. After reading the foregoing, many variants will readily occur to those skilled in the art. For instance, it will be clear that the central control unit and the module control units can be implemented in any suitable manner. The control units can for instance be designed as a programmable apparatus, such as a computer or otherwise, which is provided with computer program with which one or more of the above-described functions can be carried out. Also, the invention may be embodied in a computer program which, when loaded into a programmable apparatus, renders it suitable for carrying out a method according to the invention. The computer program can then be provided with a carrier, such as a data connection, an optical or magnetic data carrier or otherwise.

The invention claimed is:

1. A method for deriving a topology of an apparatus for processing physical documents, such as postal items, which apparatus comprises:
    an upstream document processing module arranged for performing a processing step with a physical document;
    a downstream document processing module arranged for performing a processing step with a physical document;
    a central control unit capable of controlling the upstream and downstream document processing modules at least partly; and
    a data communication network comprising:
    a central communication connection between the central control unit and at least one of the document processing modules; and
    a module communication connection connecting the upstream and downstream document processing modules in series,
    which the module communication connection has a data flow direction with a predetermined orientation with respect to a processing direction of the physical documents, and is arranged at least for transferring network configuration data from the upstream document processing module to the downstream document processing module, which said upstream document processing module is located upstream in the data flow direction with respect to said downstream document processing modules;
    wherein the method comprises:
    the upstream document processing module sending first network configuration data over the module communication connection to the downstream document processing modules, which first network configuration data represents the topology of an upstream part of the data communication network that is located upstream of the downstream document processing module and contains the upstream document processing module, the first network configuration data comprising data indicative of the document processing step performed by the upstream document processing module;
    the downstream document processing module, on the basis of the first network configuration data, generating second network configuration data, which second network configuration data represents the topology of the part of the data communication network that contains the downstream document processing module and the part located upstream of the downstream document processing module, the second network configuration data comprising data indicative of the document processing step performed by the downstream document processing module;
    the downstream document processing modules sending the second network configuration data to the central control unit over the central communication connection; and
    the central control unit deriving the topology of the data communication network on the basis of at least the second network configuration data.

2. A method according to claim 1, further comprising:
    the downstream document processing module sending a configuration request to the upstream document processing module, and in response to the request sending the first network configuration data to the downstream document processing module.

3. A method according to claim 1, wherein the first and second network configuration data contains information regarding document processing step performed by the upstream and downstream document processing modules present and the relative positions of the upstream and downstream processing modules.

4. A method according to claim 1, comprising:
    the central control unit asking for network configuration data from at least one of the upstream and downstream document processing modules.

5. A method according to claim 1, comprising:
    the central control unit receiving second network configuration data from at least two downstream document processing modules, and the central control unit determining the relative position of the downstream document processing modules by comparing the dimensions of the respective second network configuration data.

6. A method according to claim 1, wherein the module communication connection has at least two upstream network branches and connects at least one of the downstream document processing modules directly with at least two upstream document processing modules.

7. A method according to claim 1, further comprising: reconfiguring the topology of the data communication network.

8. A method according to claim 7, further comprising: modifying the physical position of at least one of the upstream or downstream document processing modules with respect to other upstream or downstream document processing modules.

9. A method according to claim 1, wherein the central control unit is connected with the upstream and downstream document processing modules via point-to-point connections.

10. A method according to claim 1, wherein the central control unit is connected with at least two of the upstream or downstream document processing modules through a tree-shaped network.

11. A method according to claim 1, wherein the central control unit is connected with at least two of the upstream or downstream document processing modules through a bus.

12. A method for deriving a topology of an apparatus for processing physical documents, such as postal items, which apparatus comprises:
an upstream document processing module arranged for performing at least one processing step with a physical document;
a downstream document processing module
a central control unit capable of controlling the upstream and downstream document processing modules at least partly; and
a data communication network comprising:
a central communication connection between the central control unit and the upstream or downstream document processing modules; and
a communication connection connecting the upstream and downstream document processing module in series,
which module communication connection has a data flow direction with a predetermined orientation with respect to a processing direction of the physical documents and is arranged at least for transferring network configuration data from the upstream document processing module to the downstream document processing module, which upstream document processing module is located upstream in the data flow direction with respect to said downstream document processing modules;
wherein the method comprises:
the central control unit receiving network configuration data from at least the downstream document processing module via the central communication connection, which network configuration data represents the topology of the part of the data communication network that contains the downstream document processing module and the part located upstream of the downstream document processing module, the network configuration data comprising data indicative of the document processing step performed by the upstream and downstream document processing modules, and
the central control unit deriving the topology of the data communication network on the basis of at least the received network configuration data.

13. A method for collecting information regarding a topology of a data communication network in an apparatus for processing physical documents, such as postal items, which apparatus comprises:
an upstream document processing module arranged for performing a processing step with a physical document;
a downstream document processing module arranged for performing a processing step with a physical document;
a central control unit capable of controlling the upstream and downstream document processing modules at least partly; and
a data communication network comprising:
a central communication connection between the central control unit and the upstream or downstream document processing modules; and
a module communication connection connecting said upstream and downstream document processing modules in series,
which module communication connection has a data flow direction with a predetermined orientation with respect to a processing direction of the physical documents and is arranged at least for transferring network configuration data from the upstream document processing module to the downstream document processing module, which upstream document processing module is located upstream in the data flow direction with respect to said downstream document processing modules;
which method comprises:
the downstream document processing modules receiving, via at least one of the module communication connection, first network configuration data which represents the topology of at least a part of the data communication network that is located upstream of the downstream document processing module, the first network configuration data comprising data indicative of the document processing step performed by the upstream document processing module;
the downstream document processing module, on the basis of the first network configuration data, generating second network configuration data which represents the topology of the part of the data communication network that contains the upstream document processing module and the part located upstream of the downstream document processing module, the second network configuration data comprising data indicative of the document processing step performed by the downstream document processing module;
outputting the second network configuration data to a downstream document processing module located further downstream and/or the central control unit via at least one module communication connection and/or central communication connection.

14. An apparatus for processing physical documents, comprising:
an upstream document processing module arranged for performing a processing step with a physical document;
a downstream document processing module arranged for performing a processing step with a physical document;
a central control unit capable of controlling the upstream and downstream document processing modules at least partly; and
a data communication network comprising;
at least one central communication connection between the central control unit and the upstream or downstream document processing modules; and
a module communication connection connecting at the downstream and upstream document processing modules in series,
which module communication connection has a data flow direction with a predetermined orientation with respect to a processing direction of the physical documents, and is arranged at least for transferring network configuration data from the upstream document processing module to the downstream processing module, which upstream document processing module is located upstream in the data flow direction with respect to said downstream document processing modules;

in which apparatus said downstream document processing module comprises:

a configuration input for receiving first network configuration data, which first network configuration data represents the topology of an upstream part of the data communication network that is located upstream of the downstream document processing module and contains the upstream document processing module, the first network configuration data comprising data indicative of the document processing step performed by the upstream document processing module;

a processor connected with the configuration input, which processor is arranged for, on the basis of the first network configuration data, generating second network configuration data which represents the topology of the part of the data communication network that contains the downstream document processing module and the part located further upstream of the document downstream processing module, the second network configuration data comprising data indicative of the document processing step performed by the downstream document processing module; and a configuration output connected with the processor, for outputting the second network configuration data to a downstream document processing module located further downstream and/or the central control unit, and in which apparatus said central control unit is communicatively connected by means of a central communication connection with at least one configuration output of the downstream document processing modules, for receiving the second network configuration data, and the central control unit is arranged for deriving the topology of the data communication network based on at least the second network configuration data.

15. A processing module for an apparatus for processing physical documents according to claim 14, comprising:

a configuration input for receiving first network configuration data, which first network configuration data represents the topology of an upstream part of the data communication network, which upstream part is located upstream of the downstream document processing module in a data flow direction and contains the upstream document processing module;

a processor connected with the configuration input, for generating, on the basis of the first network configuration data, second network configuration data which represents the topology of the part of the data communication network that contains the downstream document processing module and the part located further upstream of the downstream document processing module; and a configuration output connected with the processor, for outputting the second network configuration data.

16. A central control unit for in an apparatus for processing physical documents according to claim 14, comprising:

an input which is communicatively connectable with a configuration output of the downstream document processing module, for receiving second network configuration data, and a processor for deriving the topology of the data communication network on the basis of at least the second network configuration data.

* * * * *

UNITED STATES PATENT AND TRADEMARK OFFICE
CERTIFICATE OF CORRECTION

PATENT NO. : 7,751,342 B2  Page 1 of 1
APPLICATION NO. : 11/295684
DATED : July 6, 2010
INVENTOR(S) : Hendrik Cornelis Fijnvandraat It is certified that error appears in the above-identified patent and that said Letters Patent is hereby corrected as shown below:

Title Page, Item (73) Assignee: Delete "NEOPOST TECHNOLOGIES" and insert --NEOPOST S.A.--

Signed and Sealed this

Twenty-third Day of November, 2010

David J. Kappos
*Director of the United States Patent and Trademark Office*